United States Patent [19]

Black et al.

[11] Patent Number: 5,183,269
[45] Date of Patent: Feb. 2, 1993

[54] UNITIZED GRIT SEAL WITH REMOVABLE THRUST BUMPER

[75] Inventors: David D. Black, Elgin; Anthony W. Vering, Arlington, both of Ill.

[73] Assignee: Chicago Rawhide Manufacturing Co., Elgin, Ill.

[21] Appl. No.: 651,562

[22] Filed: Feb. 6, 1991

[51] Int. Cl.⁵ .............................................. F16J 15/32
[52] U.S. Cl. ....................................... 277/37; 277/35; 277/152
[58] Field of Search ................... 277/37, 35, 152, 153, 277/38, 39

[56] References Cited

U.S. PATENT DOCUMENTS

| | | | |
|---|---|---|---|
| 3,021,161 | 2/1962 | Rhoads et al. | 277/37 |
| 3,363,911 | 1/1968 | McKinven, Jr. | 277/153 |
| 3,510,138 | 5/1970 | Baver et al. | 277/35 |
| 3,927,600 | 12/1975 | Peisker | 409/84 |
| 3,929,340 | 12/1975 | Peisker | 277/134 |
| 4,335,887 | 7/1982 | Benassi | 277/153 |
| 4,448,426 | 5/1984 | Jackowski et al. | 277/37 |
| 4,531,748 | 7/1985 | Jackowski | 277/50 |
| 4,643,436 | 2/1987 | Jackowski | 277/153 |
| 4,962,936 | 10/1990 | Matsushina | 277/37 |
| 5,004,248 | 4/1991 | Messenger | 277/37 |
| 5,015,001 | 5/1991 | Jay | 277/37 |

Primary Examiner—William A. Cuchlinski, Jr.
Assistant Examiner—D. DePumpo
Attorney, Agent, or Firm—Lockwood Alex Fitzgibbon & Cummings

[57] ABSTRACT

A unitized, fluid seal assembly for heavy duty applications. The seal assembly includes a primary seal unit, an annular wear sleeve, and a separately formed thrust bumper made from a stiff but resilient, high temperature resistant, lubricous plastic material. The thrust bumper has a body with opposed, tapered surfaces meeting to define a narrow band that contacts the radial end face of a radial flange on the wear sleeve or the primary seal casing. The primary seal unit includes an elastomeric seal body with primary and excluder lips, and the wear sleeve includes an additional excluder lip contacting a portion of the primary seal casing.

18 Claims, 3 Drawing Sheets

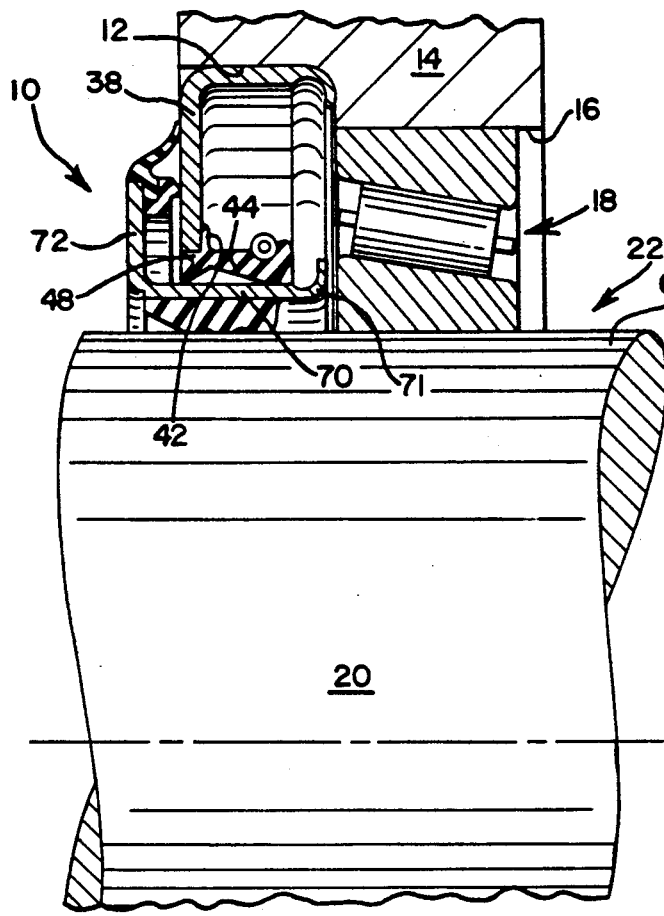
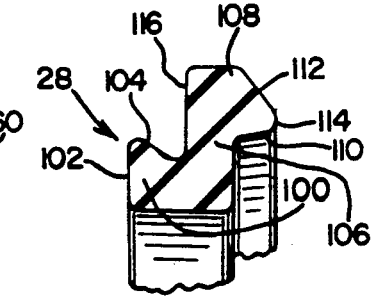
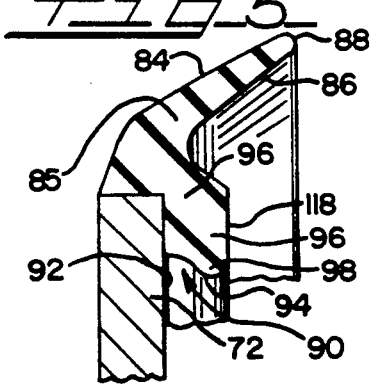
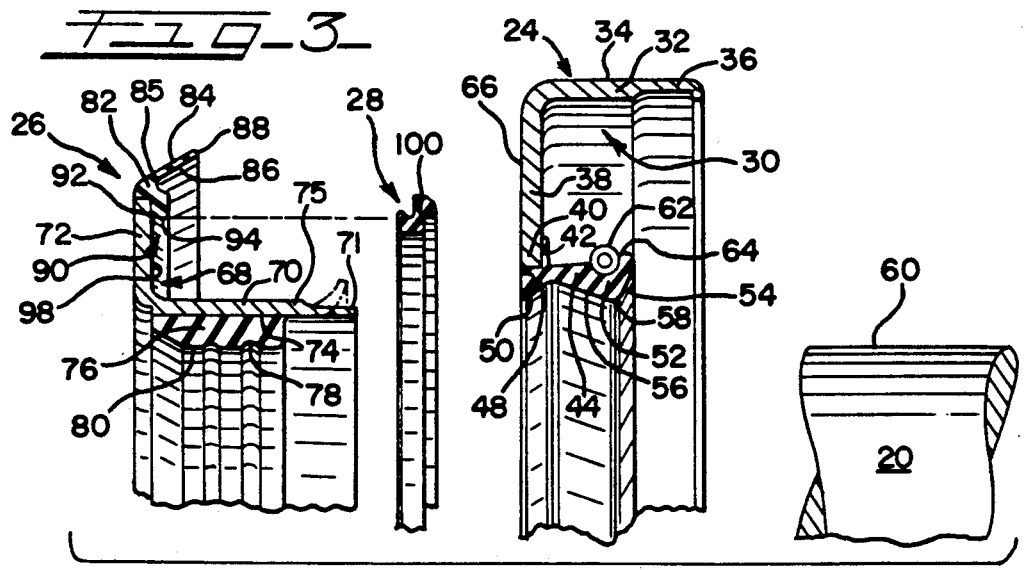

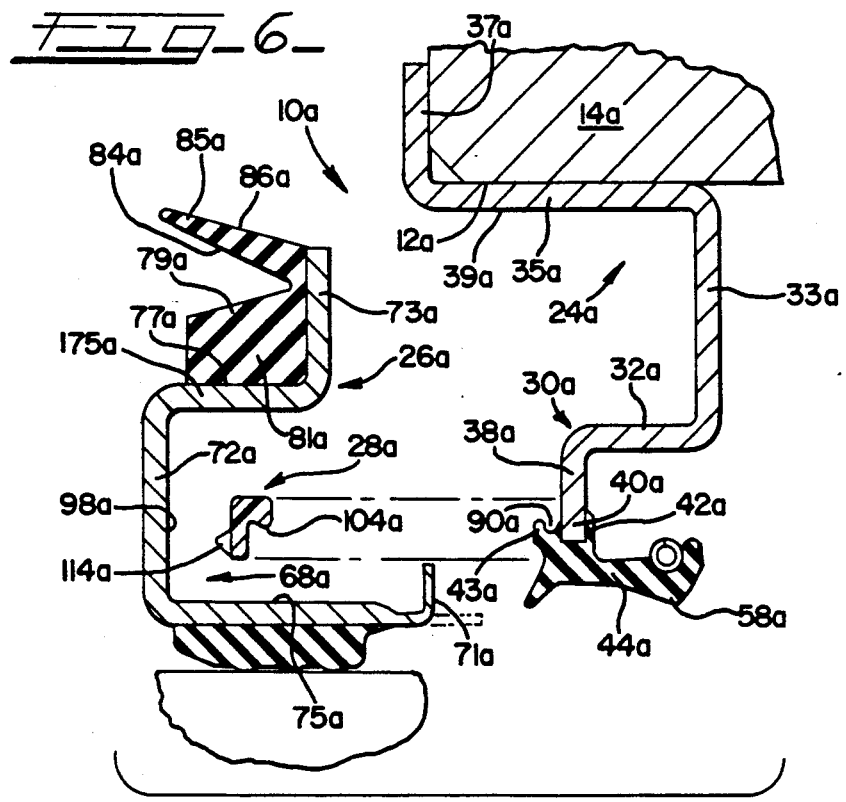
FIG_6_
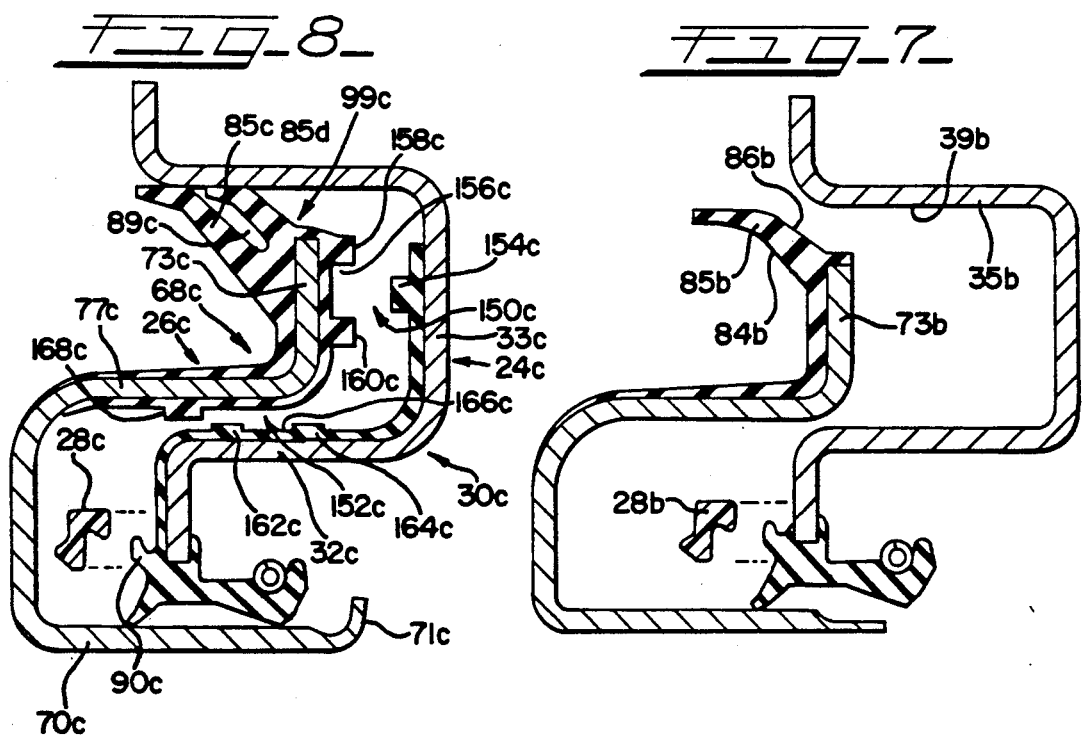
FIG_8_
FIG_7_

UNITIZED GRIT SEAL WITH REMOVABLE THRUST BUMPER

The present invention relates generally to fluid seals, and more particularly to seals adapted for use in difficult applications wherein lubricant or other fluid is intended to be retained within a sealed region and dirt, grit or other contaminants are intended to be excluded from this region and from the portion of the seal assembly actually serving to contact and retain the fluid or other lubricant within the cavity.

By way of background, some years ago, it was customary for a single piece oil seal to attempt both the exclusion and inclusion functions, i.e., to exclude dirt from the area of the primary seal lip and to utilize the primary seal lip to retain oil in sealed cavities. Where the application was severe in the sense of operating in the presence of grit, grime, dust, sand or gravel and the like, attempts were made to exclude contaminants from the area near the seal by constructing the casing in a generally labyrinthine cross section, and in some cases, to add a second casing referred to as a "slinger" which would, by reason of centrifugal force, provide a dynamic shield against the entrance of foreign matter to the near-seal area.

Seals of this kind met with a certain amount of success but in many cases, were not satisfactory in the long run. During the time that reasonably extended seal life was obtained in some instances, another drawback of then-existing seals became apparent. This was that, even where the seal was successful in retaining lubricant within the seal cavity, the presence of grit adjacent the seal lip area would cause grooving or cutting of the shaft which was exposed to an abrasive action where the sealing lip lay on the shaft surface. Grooving of a shaft is a relatively serious matter inasmuch as a shaft forms a part of a yoke, gear drive or other relatively expensive machine part which is not only made from expensive materials by expensive processes, but which is often even less accessible than the seal itself. Where the shaft in question forms a part of a pinion arrangement in a differential housing, for example, the need to replace the pinion gear is an additional, extremely serious drawback because, aside from the cost of parts, reinstallation of a pinion gear requires precise placement of the gear along three different axes.

Consequently, one step which was attempted with some success was the provision of a so-called unitized seal approach wherein the shaft was covered with what is termed a wear sleeve. In this arrangement, a wear sleeve or cylindrical metal casing covers the outside diameter of the shaft in the vicinity of the primary seal lip. A fluid tight secondary or static seal is then provided between the inside diameter of this sleeve and the outside diameter (OD) of the shaft. In use, the primary seal lip rides over the OD surface of the wear sleeve.

While this arrangement is economical and guards against the undesirable phenomenon of shaft grooving or scoring, installation of these seals requires the proper axial placement of both the sealing unit per se and the wear sleeve relative to each other and to the machine parts. Consequently, further developments were made whereby the wear sleeve included a rubber inside diameter sleeve surface and wherein the primary seal and the wear sleeve could be "unitized" by appropriate positioning and/or formation of cooperating radial flanges on the primary seal and wear sleeve, respectively. This secured the wear sleeve in a captive relation to the primary seal unit, permitting small but limited axial excursion of the two parts relative to each other. Such a practice is illustrated in various earlier patents, including commonly owned U.S. Pat. No. 4,448,426, and U.S. Pat. No. 4,643,436. However, even with developments of this kind, there was a need for further improvement and, as reflected in U.S. Pat. No. 4,531,748 above, an attempt was made to provide an excluder lip which would be resiliently biased in the axial direction by its own resiliency or otherwise, used in combination with a radially biased elastomeric primary seal lip.

In an arrangement like this, a relatively effective excluder seal can be made, but as is well known, the effectiveness of such a seal depends on the axial preload which is placed on the excluder lip. Such a need for relatively precise preload or initial deflection of the excluder lip rules out significant axial excursion, either that occasioned by misalignment or occurring in use. Problems are present in those installations wherein the wear sleeve is too far in or out of a desired position of radial alignment. Thus, if the wear sleeve is positioned too far axially inwardly, a rapid generation of heat and undue wear is occasioned, whereas an axial position which is too far outward creates a weak and ineffective seal, and sometimes a gap, between the end face of the casing and the elastomeric seal associated with it.

Under these circumstances, there has been a need for a seal which is able to be assembled as a unit at the factory and still be installed in an almost totally reliable manner.

There is a further need for ensuring that proper seal installation cannot only be confirmed in the sense of having the one relatively movable part "bottom out" against the other, but also for assuring that the seal will be able to accommodate initial wear without generation of excessive heat.

Bearing in mind that the seals often used in these kinds of applications are relatively large diameter seals, it would be preferable to provide an arrangement wherein a large number of different size parts need not be provided for different applications. In view of the failure of the prior art to provide fully effective unitized heavy duty excluder and fluid retention seals, it is an object of the prior art to provide an improved heavy duty unit capable of easy and reliable installation.

Another object of the invention is to provide a heavy duty seal which includes a wear sleeve unit and a primary seal unit held together so as to permit slight axial movement between the two parts and to provide a definite, confirming "feel" that satisfactory installation has been achieved.

A still further object of the invention is to provide a seal unit wherein the wear sleeve assembly includes a wear sleeve per se, an excluder lip, and a thrust bumper unit capable of assisting installation of the seal and providing potential for extended life in use.

Another object of the invention is to provide a seal which may include a separately manufacturable thrust bumper which is easily installed into loose-or tight-fitting position of use within an associated wear sleeve used in a severe service sealing application.

Another object of the invention is to provide a seal which is inexpensive in use and reliable in installation, and which will avoid undue heat buildup and present an extended life potential at low cost.

Another object of the invention is to provide an improved heavy duty seal which may be manufactured using existing techniques without sacrifice of reliability.

A still further object of the invention is to provide a seal unit which includes, in some cases, a low friction, readily removable thrust bumper which may be made in a variety of configurations and which will serve as an alignment stop and therefore one means of limiting heat buildup during seal operation.

Yet another object of the invention is to provide a seal constructed and arranged so that the excluder lip may be made from a given material for excellent dry wear characteristics, while the other rubber portion of the wear sleeve may be made from a rubber having excellent compression set resistance and thus being suitable as a rubber i.d. sleeve-forming material.

A further object of the invention is to provide a unitized seal which may be constructed and arranged so that the excluder lip may be formed separately from the wear sleeve casing for assembly by stretch-fitting over an axial flange on a portion of the wear sleeve casing.

A still further object of the invention is to provide a novel arrangement of elements wherein a unitized seal may take maximum advantage of radially and axially extending seal lips without generation of excessively high temperature in use and which may be installed in a virtually foolproof manner.

The foregoing and other objects and advantages of the invention are achieved in practice by providing a seal assembly which includes a primary seal unit having a casing unit and an elastomeric seal body including a primary sealing lip biased radially into engagement with a cylindrical surface on a wear sleeve element casing, with the wear sleeve element also including a flexible excluder lip adapted to seal on another cylindrical surface or a radial end face surface of the primary seal unit casing and with the wear sleeve also including a removable or fixed thrust bumper mounting arrangement; in one case such arrangement includes a groove formed in part by the excluder lip body and the wear sleeve casing, thus permitting the thrust bumper to be removably inserted into a desired position of use before assembly of the seal.

The manner in which the foregoing and other objects and advantages of the present invention are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 2 is a vertical sectional view of a portion of the composite seal assembly of the present invention, showing the seal components in a position of use with their associated machine elements;

FIG. 3 is a vertical sectional view of the seal assembly of FIG. 2, showing certain of the elements in an exploded relation;

FIG. 4 is a fragmentary view, partly in section and partly in elevation, taken on a further enlarged scale, and showing one form of thrust bumper of the present invention;

FIG. 5 is a greatly enlarged fragmentary view of the thrust bumper retainer and excluder lip portions of the wear sleeve unit;

FIG. 6 is an exploded sectional view of a modified form of seal made according to the invention;

FIG. 7 is an exploded sectional view of a further modified form of seal made according to the invention; and FIG. 8 is an exploded sectional view of a still further modified form of seal made according to the invention.

DESCRIPTION OF THE PREFERRED EMBODIMENTS OF THE INVENTION

Figure 1:
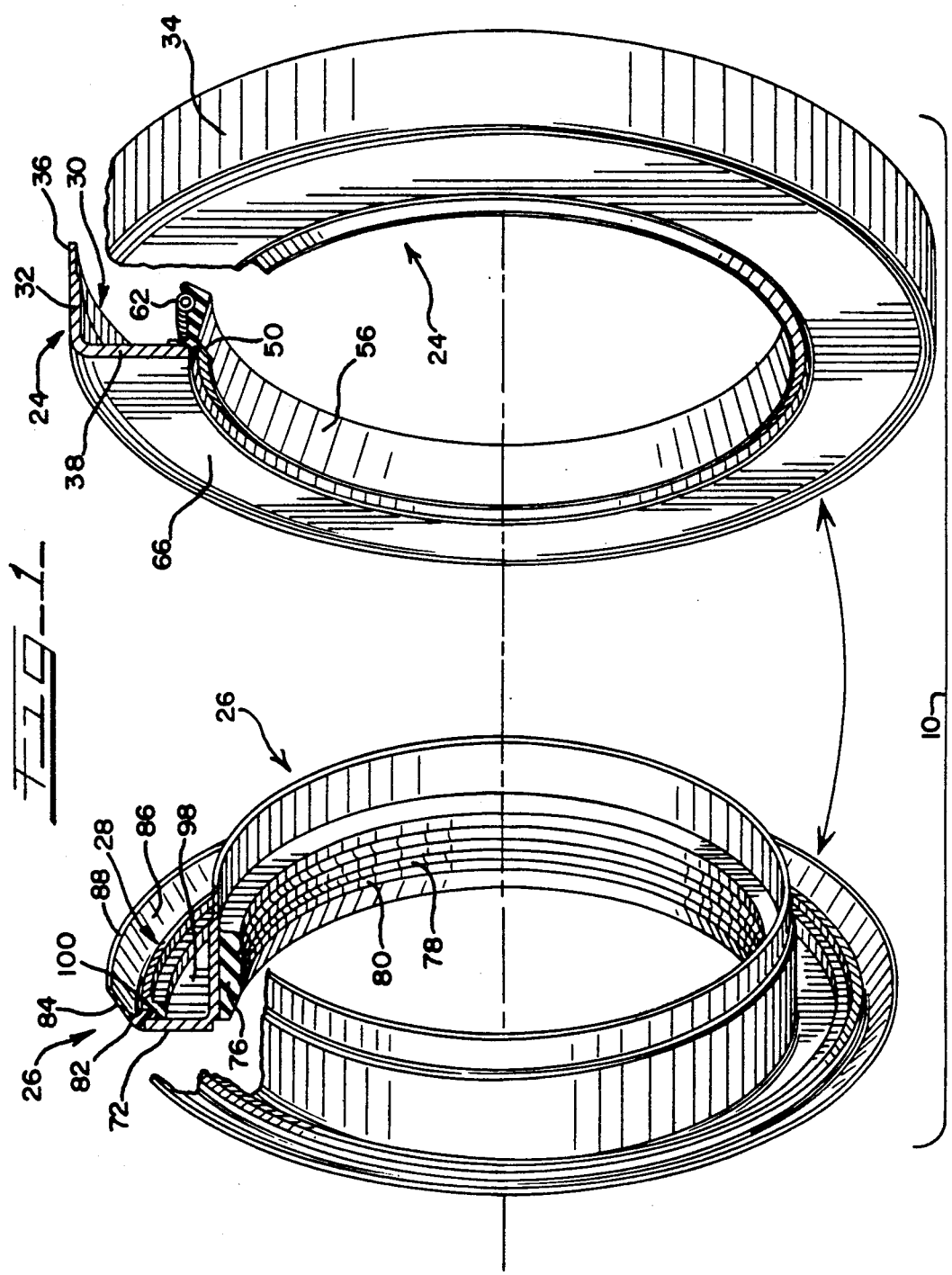
FIG. 1 is a perspective view of the composite seal assembly of the invention, showing the seal unit and wear sleeve in exploded, partially facing relation.

While the invention is capable of a variety of uses, and while the parts described in detail may be embodied in different forms, a detailed description will be made of a few relatively simple forms of the invention wherein the three principal elements are present and wherein exemplary intended applications are those of power takeoffs and final drive units for heavy duty agricultural and/or construction equipment.

Referring now to the drawings in greater detail, FIG. 1 shows, in exploded perspective relation, the primary seal unit and the subassembly comprising the wear sleeve and thrust bumper unit. In use, these parts are assembled to form a single seal assembly.

Referring now to FIG. 2, the invention is shown to be embodied in a fluid seal assembly generally designated 10 and shown to be emplaced in position of use within the counterbore 12 of a machine housing 14. The housing 14 includes a bore 16 positioning a tapered roller bearing assembly generally designated 18 and serving to journal a rotary shaft 20 which forms an element of a final drive unit or the like generally designated 22.

Referring to FIGS. 1 and 3, for example, the seal assembly 10 is shown to include three principal, separable components, a primary seal assembly generally designated 24, a composite wear sleeve assembly generally designated 26 and a removable thrust bumper unit generally designated 28.

Referring now to the primary seal assembly 24, this unit is of a generally conventional character and is shown to include an annular casing unit generally designated 30, having an axially extending flange 32 with an outer, generally cylindrical mounting surface 34 terminating at its axially outer end in a reduced thickness curl portion 36. The casing 30 also includes a radial flange 38 having a radially innermost margin 40 to which the annular bonding tab 42 of an annular elastomeric seal body 44 is affixed.

The heel portion 48 of the seal body includes a so-called auxiliary lip 50, sometimes called a dirt or dust lip, while the primary lip 52 includes converging, axially inner and outer frustoconical surfaces 54, 56 meeting along a generally circular locus to from a primary seal band 58 of intended contact with the outer diameter surface 60 of the shaft 20. The inner and outer surfaces 54, 56 are also sometimes referred to as the "oil" and "air" side surfaces of the seal body, respectively; the oil side surface is more steeply inclined than the air side when the surfaces are viewed in section. A garter spring 62 is received within an annular groove 64 to provide a radial load for the sealing lip in a known manner.

While the seal band 58 is generally circular, it may also undulate axially to a certain extent, so as to lie on the associated shaft in a somewhat sinusoidal pattern. Such seals are described and claimed in co-owned U.S. Pat. Nos. 3,927,600 and 3,929,340. According to the invention, the axially outer end face surface 66 of the casing radial flange 38 has a relatively smooth finish and is capable of serving as a portion of a sealing surface, as will appear. By "axially outer" and "inner" are respectively meant facing away from and toward the sealed or lubricant-containing region.

Referring now to the wear sleeve assembly generally designated 26, this unit is shown to include a casing generally designated 68, which in turn includes axial and radial flanges respectively 70, 72. A reduced thickness portion 71 forms the end of the axial flange 70; when the seal is assembled, the portion 71 is curled as shown in phantom lines in FIG. 3 so as to "unitize" the seal, i.e., to prevent unintended separation of the parts 24, 26. The radially inwardly facing cylindrical surface 74 of the axial flange 70 is covered by a generally cylindrical body 76 of elastomer having a contoured or ribbed inner surface 78. The opposite surface of the axial flange is the wearing surface 75 of the wear sleeve 26. The contours on the surface 78 of the elastomeric body 76 include plural, spaced apart ribs 80 which, when suitably slightly deformed, will form a mechanically secure, fluid tight fit with the outside diameter surface 60 of the shaft 20 so as to prevent passage of fluid therealong. This is often called a static or secondary seal, because there is no intentional relative movement of the parts where this seal is formed.

Another element of the wear sleeve assembly 26 is the excluder seal body 82, which in this embodiment includes a flexible lip 85 defined by a pair of closely spaced apart, generally frustoconical surfaces 84, 86 terminating in an annular end surface portion 88. The lip 85 formed by the surfaces 84, 86, is flexible; when the lip 85 is deflected slightly so as to have a portion of its end 88 lying along the end face surface 66 of the casing 30, it will act to exclude dust and contaminants from the enclosed area between the two assemblies 24, 26.

At the inner part of the excluder seal body 82 are means in the form of a circumferential groove generally designated 90 for positioning the thrust bumper 28. The groove 90 is formed by the combination of an inner end face surface 92 of the radial casing flange 72 and the radially inwardly directed contours 94 of a thrust bumper positioning body 96. As shown in greatly enlarged cross section in FIG. 5, the groove 90 is contoured so as to have a rib 98 offset from and parallel to the end face surface 92. These elements coact to provide a snap-in feature as well as positive radial location for the thrust bumper 28.

Referring now to the thrust bumper 28, this unit is shown in FIG. 4 to be of generally S-shaped cross section and to include a mounting section 100 which includes an axial end face 102 adapted to lie along the opposed face 92 of the radial flange 72, a contoured locating land portion 104 adapted to be received within the groove 90, a center body portion 106, and a flange contact body 108 defined by converging beveled, circumferentially extending radially inner and outer surfaces 110, 112, meeting along a flange contact band 114. In use, the surface 114 will engage the end face surface 66 on the radial flange 38 of the seal casing 30 for purposes which will appear. Positioning of the thrust bumper 28 is also achieved in part by engagement between the end face surface 116 on the bumper 28 and the end face surface 118 on the thrust bumper positioning body 96. This provides a stiff but resilient backing force for the thrust bumper 28.

In the foregoing description, the thrust bumper unit 28 has been shown as being adapted for removable mounting relative to a groove formed in part by the excluder lip body. However, it is considered within the scope of the invention to provide other means for positioning the thrust bumper such that its flange contact band is aligned with the end face surface of the primary seal unit; after the seal is unitized by rolling the curl in the sleeve portion 71 or its counterpart, the thrust bumper will remain located by the unitizing action of the curl. In this case, it need not be held by the "snap-in" arrangement of the excluder lip.

In a further modification of the invention, the thrust bumper may be bonded permanently to the excluder lip body or to the casing flange, or both, as a means of mechanically positioning it for its intended application.

Referring now to the manufacture and assembly of the parts, the primary seal assembly 24 is formed in a conventional manner, i.e., compression, transfer, or injection molding of the elastomeric part while a portion of the casing flange is held within a mold. Such insert molding techniques are well known to those skilled in the art. The primary seal body may be made from an elastomer such as a nitrile rubber or the like, or may be made from other materials such as fluoroelastomers, carboxylated nitriles, or other material compatible with the lubricant to be sealed and the additives in such lubricants. Garter springs such as the spring 62 are preferably used to provide a radial compressive load on the primary seal band 58, but their use is not absolutely necessary. The casing 30 is shown in this embodiment to be in the from of a so-called "L-cup", but one or more additional flanges, beads, or offsets may be placed in the casing if these are necessary for some reason. The auxiliary or so-called dust lip is preferably present but not absolutely necessary in keeping with the invention.

Referring now to the wear sleeve, one preferred form of construction has been illustrated, i.e., an L-shaped casing having a contoured rubber inner diameter body for a fluid-tight press fit over an associated shaft. The wearing surface 75 may simply be a portion of the casing, having a surface finish of a desired character. However, the surface 75 may also be a treated surface, i.e., one which has a coating of chromium, stainless steel, or the like, or may include a bonded layer of a non-metal material if this is desired for some reason.

The rubber portions, including the cylindrical elastomer 76 and the elastomeric excluder seal body 82 are also formed by injection or compression molding in a manner known to those skilled in the art, and the elastomers selected may be the same or different from each other and may be the same or different from those used to form the primary seal lip. In some instances, the shape of the casing may be selected to assist in implementing this concept; i.e., an additional radial or axial flange can be provided to facilitate the molding process.

The thrust bumper unit is preferably formed in a separate operation, such as injection molding or the like, to finished dimensions. However, this part may also be rough molded and then machined to final size or surface finish if this is desired for some reason. According to the preferred form of the invention, the thrust bumper is a hard plastic material which, when placed in facing relation to the associated end face of the primary seal casing radial flange under a measurable preload will deform to a minimal extent and will also create a minimum amount of frictional heat. The presently preferred material for this component is polyphenyl sulfide material, but other plastic materials such as sulphones, acetals, or fluoroplastic materials may be used, merely by way of example. Preferably, the material selected will not readily take a compression set and will also be highly resistant to abrasion and high temperatures. Those skilled in the art are aware of materials which are suitable for this purpose.

Referring now to the assembly of the seal 10, assuming that the thrust bumper unit 28, the primary seal element 24 and wear sleeve element 26 have been manufactured as described, the individual elements are positioned as shown in FIG. 3. After the thrust bumper 28 is aligned coaxially with the wear sleeve, as shown in the phantom lines, the thrust bumper is simply advanced towards the radial flange 72 of the wear sleeve until the contoured locating land 104 snaps within the positioning groove 90. At this point, the end faces 116 and 118 of the thrust bumper and the positioning body 96 are engaged in snug relation.

Thereupon, the subassembly including the thrust bumper and the wear sleeve are advanced toward the primary seal unit, or vice versa, that is, the elements shown in FIG. 3 are moved towards each other. When the nose surface 114 on the thrust bumper 28 engages the end face 66 on the flange 38, and is retained there in snug relation, the seal is properly assembled. Thereafter, a curl is imparted to the portion 71 of the cylindrical flange 70 of the wear sleeve, insuring that the seal will remain in a unitized condition.

When normal installation is attempted, the outer surface 34 of the mounting flange 32 is positioned within the counterbore 12 in the machine housing 14. Then, the shaft 20 is inserted through the rubber i.d. collar 78. Continued movement of the shaft 20 to its fully installed position results in carrying the wear sleeve unit 26 to a position whereat the thrust bumper contact band 114 engages the end face 66 of the casing radial flange 38. This preloads the excluder lip 85, and even if the shaft movement (to the right as in FIG. 2) continues, the wear sleeve unit 26 will not continue movement The thrust bumper thus provides the exact alignment necessary to preload the excluder lip 85.

When the seal is installed in this manner, the preload on the lip 85 will be correct, and a desired excluder action can be achieved. The auxiliary excluder action of the thrust bumper may contribute somewhat to the sealing performance but in any case, even initial rotation, because of the hard, lubricous nature of the thrust bumper should minimize temperature rise in the seal. The positive "feel" imparted by bottoming out of the thrust bumper thus insures that the installation will be correctly made, i.e., the primary seal lip 58 will also rest on a desired portion of the surface 75 of the wear sleeve 26. In use, the combination of two excluder lips and one primary lip provides outstanding performance in use.

Referring now to FIGS. 6, 7 and 8, other embodiments of the novel seal unit of the invention are shown. In these illustrations, the elements are similar to those of their counterparts in FIGS. 1-5. However, the forms of seal to be described in detail differ in the form of casings shown, the detailed construction of the excluder lips and the provision of additional elements creating a labyrinth-type excluder effect. In addition, the illustrations to be described show that the thrust bumper may be reversed in configuration and location, i.e., it may be snapped into position with respect to the primary seal casing and have an end portion engaging the wear sleeve, and the nose portion may lie radially inwardly of the locating land portion.

Referring again to the drawings in greater detail, FIG. 6 shows a seal assembly generally designated 10a and shown to include a primary seal assembly 24a, a wear sleeve generally designated 26a and a thrust bumper generally designated 28a. The primary seal casing 30a is similar to its counterpart in FIGS. 1-5, and hence will not be described in detail except where it differs from the earlier embodiment. In this respect, in addition to the first axial flange 32a making up the casing unit 30a, the seal also includes a second radial flange 33a, an enlarged, cylindrical mounting flange portion 35a and an outermost radial locating radial flange 37a. In this construction, the flange 37a serves to locate the axial positioning of the seal relative to a counterbore surface 12a in a machine element 14a.

Referring again to FIG. 6, the elastomeric body 44a of the primary seal unit 26a includes not only the tab portion 42a, but also includes a thrust bumper positioning body 43a affixed to the radially inner margin 40a of the casing radial flange 38a. This body 43a includes surfaces forming a locating groove 90a for the thrust bumper 28a. A cylindrical surface 39a for engagement with the excluder lip is formed on the radially inner cylindrical surface 39a of the flange 35a.

The wear sleeve 26a is similar to its counterpart in FIG. 1-5, except that it also has a more convoluted, labyrinth-style casing which includes not only the inner radial flange 72a but an outer radial flange 73a formed as an end portion of a second axial flange 175a. The outer surface 77a of the flange 175a serves to position a separately manufactured excluder lip unit 79a which may be placed over the flange 175a after manufacture. This lip unit 79a is held in place by its own hoop stress or by an adhesive system. This unit 79a includes a main body portion 81a and a flexible excluder lip 85a formed by circumferentially extending frustoconical surfaces 84a, 86a. The radially inner portions of the wear sleeve, including the surface 75a centered for engagement by the seal band of the primary lip unit also resemble their counterparts in FIG. 3, for example.

Referring now to the thrust bumper 28a, this unit also includes a circumferentially extending contact surface 114a, and is the same as its counterpart shown in FIG. 4 except for two aspects. The first of these is that the contact surface 114a lies near the radially inner portion of the bumper 28a, and the positioning land 104a lies radially nearer the outer portion thereof. The second difference is that because the bumper is positioned by the primary seal, the contact surface 114a, in use, bears the axially inner end face surface 98a of the wear sleeve casing 68a.

In addition, the embodiment of FIG. 6 differs from its counterpart in FIGS. 1-5 in that the outermost excluder lip 85a acts radially rather than as an end face seal. Still further, the more convoluted casing shapes create a labyrinth effect for additional dirt exclusion and increases the time and/or distance for dirt or grit to travel to the oil supply area.

Referring now to FIG. 7, a further modified form of seal is shown which is very similar to its counterpart in FIG. 6. The main differences are that the outermost excluder lip 85b, which is defined by surfaces 84b, 86b, is molded from rubber bonded to the casing flange 73b; in use, it engages the surface 39b of the casing flange 35b. The thrust bumper 28b is located and oriented in the same way is its counterpart in the embodiment of FIG. 6. The other significant differences in these embodiments are the separately molded, removable character of the "V-ring" auxiliary seal shown in FIG. 6.

Referring now to FIG. 8, a still further variation of the form of invention is shown. Here, the embodiment shown also includes a primary seal element 24c having a casing 30c, a wear sleeve generally designated 26c and having a casing element 68c, and a thrust bumper unit 28c. In this embodiment, an integrally formed outer excluder seal assembly 99c is shown to include two auxiliary lips 85c, 85d, disposed in generally parallel relation; these are preferably formed from an elastomer bonded directly to a flange 73c of the casing 68c.

The second difference is the provision of two sets of labyrinth units generally designated 150c, 152c. The first labyrinth unit 150c includes a stationery land or rib 154c which extends circumferentially about the radial flange 33c of the casing 30c. This land cooperates with a groove 156c formed between closely spaced apart lands 158c, 160c on the oppositely directed face of the wear sleeve casing flange 73c. Hence, this forms a radial labyrinth when the elements are assembled together in the relation shown for their counterparts in FIG. 2, for example. FIG. 8 shows these elements in slightly spaced apart relation so the positioning of the thrust bumper may be clearly seen.

Referring to the axial labyrinth 152c, this unit is shown to be formed by closely axially spaced apart lands 162c, 164c forming a groove 166c. In use, this groove is disposed in opposed facing relation to the land 168c. There is only a slight clearance between the i.d. of the land 168c and the o.d. of the lands 162c, 164c. The lands 162c, 164c are integrally formed from an elastomer which is bonded to the casing flange 32c. The land 168c is bonded to the casing flange 77c.

As shown in FIG. 8, which is slightly axially exploded, the thrust bumper is positioned such that its land lies within the locating groove 90c. When the seal elements are to be assembled, the primary seal unit 24c and the wear sleeve 26c are pushed axially together such that the land 168c is positioned in facing relation to, but not actually within the groove 166c between the lands 162c, 164c.

The construction of FIG. 8 affords not only a pair of exterior excluder lips but also two excluder labyrinths. The space 89c between the lips 85c, 85d may be filled with grease upon initial installation if this is desired. Phantom line show that a curl 71c can be found on the end of the wear sleeve casing flange 70c after the parts are positioned for assembly.

The embodiments shown in the foregoing FIGS. 6–8 show variations of the preferred form of invention, which variations include various auxiliary excluder lips for the grit excluding functions. All forms, however, include a removable thrust bumper in one form or another.

In use, the different forms of product each display certain advantages and characteristic of their respective constructions.

It will thus be seen that the present invention provides an improved fluid seal assembly having a number of novel advantages and characteristics, including those referred to specifically herein and others which are inherent in the invention. Various preferred forms of seals made according to the invention having been described in detail, by way of example, it is anticipated that the variations in the described forms of construction may occur to those skilled in the art, and that such variations may be made without departing from the spirit of the invention or the scope of the appended claims.

We claim:

1. A unitized, fluid retaining and grit exclusion seal assembly for heavy duty applications, said seal assembly comprising, in combination, an annular primary seal unit, an annular wear sleeve assembly having an annular wear sleeve casing, an excluder lip portion, and a thrust bumper element, said primary seal unit comprising a casing having a mounting portion and a radially extending flange portion for positioning an elastomeric primary seal body, said elastomeric primary seal body having one portion thereof bonded to a radially inner margin of said radial positioning flange, said elastomeric seal body being defined in part by air and oil side frustoconical surfaces meeting along a generally circular locus to form a primary seal band area of intended contact with a portion of said wear sleeve casing, said wear sleeve comprising a generally cylindrical, axially extending flange positionable in fluid tight relation with an associated rotary shaft to be sealed and at least one radial flange extending outwardly from the axially outer portion of said cylindrical flange, with the radially outwardly directed surface of said cylindrical flange being constructed, arranged and sized for fluid sealing contact between a portion of its surface and said seal band area on said seal lip body, with said excluder lip portion of said wear sleeve assembly having a lip end portion contacting a cooperating portion of said primary elastomeric primary seal casing, said thrust bumper element being made from a stiff but resilient high temperature resistant, lubricous plastic material, and including a thrust bumper body portion having opposed tapered surfaces meeting to define a narrow band of intended contact with an end face of a radial flange on one of said wear sleeve casing and said primary seal casing, said bumper body being positioned in use relative to said one casing so that said narrow contact band in use is, at most, slightly spaced from said end face surface of said one of said wear sleeve casing and said primary seal casing.

2. A seal assembly as defined in claim 1 wherein said thrust bumper and said excluder lip portion of said wear sleeve assembly include cooperating land and groove portions permitting removable mounting of said thrust bumper.

3. A seal assembly as defined in claim 1 wherein said elastomeric seal body further includes a thrust bumper mounting groove and said thrust bumper element includes a mounting land whereby said thrust bumper element may be mounted removably with respect to said elastomeric seal body.

4. A seal assembly as defined in claim 1 wherein said cylindrical flange of said wear sleeve casing further includes a locking flange formed on its axially inner end portion, said locking flange extending radially outwardly of said cylindrical casing flange.

5. A seal assembly as defined in claim 1 wherein the portion of primary seal casing engaged by said excluder lip is a radial flange on said primary seal unit casing.

6. A seal unit as defined in claim 5 wherein said lip end portion of said excluder lip is a single lip portion.

7. A seal unit as defined in claim 1 wherein said excluder lip portion of said wear sleeve is formed separately from said wear sleeve casing, and said lip portion surrounding and being engaged with a flange on said wear sleeve casing, and said lip portion excluder lip including a body portion and a single, radially outwardly acting lip end portion adapted to engage an axial flange portion of said primary seal casing in snug sealing engagement therewith.

8. A seal assembly as defined in claim 1 wherein said elastomeric primary seal body and said excluder lip portion of said wear sleeve assembly are made from different elastomeric materials.

9. A seal assembly as defined in claim 1 wherein said plastic thrust bumper is made from a thermoplastic material.

10. A seal assembly as defined in claim 1 wherein said primary seal unit and said wear sleeve assembly each include at least two radial casing flanges and at least two axial casing flanges, whereby a labyrinth providing resistance to entry of grit is provided to reduce entry of grit from the exterior of said seal assembly to the interior thereof.

11. A seal assembly as defined in claim 1 which each of said wear sleeve assembly and said primary seal unit includes cooperating annular formations made from an elastomeric material and arranged to provide a labyrinth construction affording resistance to the entry of grit into the sealed region from the exterior thereof.

12. A seal assembly as defined in claim 1 wherein said wear sleeve casing further includes a cylindrical elastomeric collar on its inside diameter.

13. A unitized, fluid retaining and grit exclusion seal assembly for heavy duty applications, said seal assembly comprising, in combination, an annular primary seal unit, an annular wear sleeve assembly having an annular wear sleeve casing, an excluder lip portion, and a removable thrust bumper element, said primary seal unit comprising a casing having a cylindrical mounting flange portion and a radially extending flange portion, an elastomeric primary seal body having one portion thereof bonded to a radially inner margin of said radially extending flange, said elastomeric seal body including air and oil side frustoconical surfaces meeting along a generally circular locus to form a primary seal band area of intended contact with a portion of said wear sleeve casing, said wear sleeve comprising a generally cylindrical, axially extending flange positionable in fluid tight relation with an associated rotary shaft to be sealed and a radial flange extending outwardly from the axially outer portion of said cylindrical flange, said excluder lip portion including a lip body bonded to an outer margin of said wear sleeve radial flange, said lip body also including surfaces defining an annular thrust bumper mounting groove, with the radially outwardly directed surface of said cylindrical flange engaging said seal band area on said seal lip body, said excluder lip portion having a lip end section engaged in end face seating contact with an outer end face of said primary seal casing radial flange, said thrust bumper element being made from a stiff but resilient high temperature resistant, lubricous plastic material and having a mounting land for complementary engagement with said mounting groove on said excluder lip body, said thrust bumper also having opposed tapered surfaces defining a contact area positioned opposite said end face of said primary seal radial flange.

14. A fluid seal as defined in claim 13 wherein said annular wear sleeve casing further includes a cylindrical elastomeric mounting collar for shaft engagement, said collar being bonded to the radially inner surface of said wear sleeve casing.

15. A unitized, fluid retaining and grit exclusion seal assembly for heavy duty applications, said seal assembly comprising, in combination, an annular primary seal unit, an annular wear sleeve assembly having a wear sleeve casing, an excluder lip unit, and a removably mounted thrust bumper element, said primary seal unit comprising a casing having an axially extending mounting flange portion, and a first and second, axially offset, radially extending flanges an elastomeric primary seal body having one portion thereof bonded to a radially inner margin of said first radial casing flange, said primary seal body also including air and oil side frustoconical surfaces meeting along a generally circular locus to form a primary seal band area, and surfaces defining an annular mounting groove for said thrust bumper, said wear sleeve casing including a first, generally cylindrical flange positionable in fluid tight relation with an associated rotary shaft to be sealed, a first radial flange extending outwardly from the axially outer end of said first cylindrical flange, an inner end face on said first radial flange for engaging a portion of said thrust bumper, a second axial flange having a mounting surface for said excluder lip unit, and a second radial flange, with the radially outwardly directed surface of said first cylindrical flange being engaged in use by said seal band area on said primary seal body to create a fluid seal, with said excluder lip unit having a mounting body portion and a flexible lip portion, said mounting body portion being received over said mounting surface on said second axial flange on said wear sleeve, said flexible lip portion contacting a radially inwardly facing surface of said axially extending mounting flange of said primary seal casing, said thrust bumper element being made from a stiff but resilient high temperature resistant, lubricous plastic material, and including a thrust bumper body portion having opposed tapered surfaces meeting to define a narrow band of intended contact with an inner end face of said first radial flange of said wear sleeve casing, said thrust bumper further including a mounting land complementary to said mounting groove, with said thrust bumper being positioned relative to said inner end face so that in use, said narrow band is, at most, slightly spaced from said inner end face surface.

16. A seal assembly as defined in claim 15 wherein said primary seal body further includes an integrally formed auxiliary excluder lip.

17. A seal assembly as defined in claim 15 wherein said mounting portion of said excluder lip is removably affixed to said second axial flange of said wear sleeve casing.

18. A seal assembly as defined in claim 15 wherein said flexible lip portion of said excluder lip unit includes at least two separate lips for contact with said mounting flange surface.

* * * * *